United States Patent
Drechsel

(10) Patent No.: US 7,051,952 B2
(45) Date of Patent: May 30, 2006

(54) IRRIGATION SYSTEM

(76) Inventor: Arno Drechsel, Gasserstrasse 3, A-9900, Lienz (AT)

( * ) Notice: Subject to any disclaimer, the term of this patent is extended or adjusted under 35 U.S.C. 154(b) by 182 days.

(21) Appl. No.: 10/470,148

(22) PCT Filed: Aug. 9, 2001

(86) PCT No.: PCT/AT01/00264

§ 371 (c)(1),
(2), (4) Date: Jul. 24, 2003

(87) PCT Pub. No.: WO02/060236

PCT Pub. Date: Aug. 8, 2002

(65) Prior Publication Data

US 2004/0089735 A1    May 13, 2004

(30) Foreign Application Priority Data

Jan. 30, 2001    (AT) ............................... A 147/2001

(51) Int. Cl.
*B05B 3/06*    (2006.01)

(52) U.S. Cl. ...................... 239/256; 239/233; 239/230; 239/728; 239/745; 239/DIG. 1; 239/69; 239/587.1

(58) Field of Classification Search ........ 239/722–754, 239/146–176, 587.1–588, DIG. 1, 230, 233, 239/222.15, 69
See application file for complete search history.

(56) References Cited

U.S. PATENT DOCUMENTS

| | | | | |
|---|---|---|---|---|
| 3,802,627 A | * | 4/1974 | Seckler et al. .............. | 239/729 |
| 3,952,954 A | * | 4/1976 | Taylor ......................... | 239/236 |
| 4,033,508 A | * | 7/1977 | Jacobi et al. ................ | 239/729 |
| 4,186,880 A | * | 2/1980 | Jacobi et al. ................ | 239/729 |
| 4,249,698 A | * | 2/1981 | Smith et al. .................. | 239/1 |
| 4,700,897 A | | 10/1987 | Smith et al. | |
| 4,809,910 A | * | 3/1989 | Meyer ......................... | 239/1 |
| 5,020,730 A | | 6/1991 | Perroud et al. | |
| 5,390,858 A | | 2/1995 | Watson | |
| 6,402,048 B1 | * | 6/2002 | Collins ........................ | 239/63 |
| 2005/0077401 A1 | * | 4/2005 | Sinden et al. ............... | 239/722 |

FOREIGN PATENT DOCUMENTS

| | | |
|---|---|---|
| EP | 0519887 | 6/1992 |
| FR | 2627662 | 2/1988 |
| GB | 2150862 | 7/1985 |
| WO | 0013486 | 3/2000 |

OTHER PUBLICATIONS

International Search Report.

* cited by examiner

*Primary Examiner*—Dinh Q. Nguyen
(74) *Attorney, Agent, or Firm*—Notaro & Michalos PC

(57) ABSTRACT

The invention relates to an irrigation system particularly for plant cultures comprising an irrigation arm which can be pivoted in a horizontal angle region around an essentially vertical axis, a water jet exiting from the front thereof. According to the invention, an electronic control device (10) controls the horizontal angle region ($\alpha$) which is covered by the irrigation arm (6), the control device (10) contains an electronic memory (23), wherein the values of two or more horizontal angle regions can be digitally stored, and a programmable run-off control element (22) wherein a sequence of stored horizontal angle regions can be established. The stored horizontal angle regions can be established by means of a GPS receiver.

9 Claims, 9 Drawing Sheets ically controlled sprinkler system according to the invention allows numerous different irrigation sectors (horizontal angle regions swept by the water jet of the sprinkler arm) to be easily stored in advance in the electronic memory. Such a horizontal angle region can be defined for example by storing the respective turning points at the edge
IRRIGATION SYSTEM

BACKGROUND OF THE INVENTION

The invention relates to a sprinkler system with a sprinkler arm, swivellable in a horizontal angle region about an essentially vertical axis, from which a water jet emerges at the front.

Such sprinkler system are in particular for use in plant cultures.

Such sprinkler systems are already known and are already used in practice, wherein a spooler often retracts a moveable sprinkler trolley via a water hose, on which for its part the sprinkler arm is swivellably housed. In addition, the international patent application WO00/13486 shows such a sprinkler system. With such systems, the sprinkler trolley with the hose is extended, for example with the help of a tractor, the water hose being wound by the spooler. In actual operation, the spooler then retracts the sprinkler trolley on the hose to itself, a sprinkler arm, turning left and right, irrigating a prespecified sector by means of a water jet emerging from the sprinkler arm. A jet interrupter can be provided at the free end of the sprinkler arm, which alternately engages with the water jet and fans it out resulting in a "water curtain" irrigating essentially the whole sector. The jet interrupter can also adopt the function of a jet diversion, the torque produced thereby being able to be used to swivel the sprinkler arm by a horizontal angle about a vertical axis. There is therefore no need for a separate drive for this horizontal movement over the irrigation sector. Rather the water energy can be used for this.

Older variants of such irrigation systems are very inflexible in operation. At most, they allow only a basic setting, i.e. that the sprinkler arm sweeps a single predefined sector. Although an adjustment is possible, it is relatively time-consuming and was often carried out by users with the sprinkler switched on, which represents a great danger in view of the high-pressure water jet. Such an adjustment is for example necessary if a road which must not be sprinkled passes the end of the site to be sprinkled. Then the sprinkling sector must be aligned for example semicircular to the spooler. After a specific retraction distance, an adjustment is then necessary by means of which the sprinkling sector is changed such that it faces away from the spooler.

The above-mentioned WO00/13486 already shows a sprinkler system in which the sector swept by the sprinkler arm can be changed during retraction by means of the spooler, i.e. during irrigation, without manual intervention. However, the construction there is very expensive and still inflexible. Turning points must be defined with mechanical pins which can be secured to a plate, each of which points defines the end of a sector. Each of these sectors defined by mechanical end points can then be selected via a control system.

In addition, there is also the option of swivelling the sprinkler arm about a fixed axis or of housing it at the end of a large rotatable irrigation arm.

SUMMARY OF THE INVENTION

The object of the invention is to create an improved sprinkler system of the type mentioned at the outset which can be easily adapted to the irrigation requirements of the surface at hand. In addition, it should offer the possibility of automatically and continually taking into account external parameters such as wind direction, wind speed and/or the water pressure during the irrigation.

According to the invention, this is achieved by an electronic control apparatus via which the horizontal angle region swept by the sprinkler arm can be adjusted. Advantageously the control apparatus has an electronic memory in which values for two or more horizontal angle regions can be digitally stored and a programmable sequencer via which a sequence of stored horizontal angle regions can be specified.

The electronically controlled sprinkler system according to the invention allows numerous different irrigation sectors (horizontal angle regions swept by the water jet of the sprinkler arm) to be easily stored in advance in the electronic memory. Such a horizontal angle region can be defined for example by storing the respective turning points at the edge of such a horizontal angle region, at which therefore the sprinkler arm turns its swivel direction about a vertical axis. The sprinkler arm thus swivels back and forth in operation between the two turning points currently selected by a programmable sequencer in the current horizontal angle region, and irrigates the site. However it is also possible to store the horizontal angle regions "indirectly", for example in the form of parameters from which the control of the turning points is first calculated. Finally it is preferably provided that the control system has a GPS receiver with a memory for storing several ground points. With this, the horizontal angle regions can be calculated and specified via stored ground points.

Via the mentioned programmable sequencer, the horizontal angle region can be easily changed during operation. This can be carried out under "normal conditions", for example depending on the retraction distance of the water hose on the spooler. For this purpose, the rotational state of the spooler can be recorded. Time-dependent sequencers are however also perfectly conceivable and possible.

In addition, the electronic sprinkler system according to the invention allows circumstances deviating from the "normal conditions" to automatically be taken into account. This includes in particular the influence of the wind which deflects the water jet emerging from the water arm and thus, without correction, sprinkles a region other than that corresponding to the desired specified sector (horizontal angle region).

According to a preferred version of the invention, an apparatus for recording the wind strength and/or the wind direction is therefore present, which delivers electric signals to the electronic control apparatus which then changes the current horizontal angle region in order to compensate for the influence of the wind. Advantageously the vertical angle, i.e. the height setting of the sprinkler arm, can also be shifted about a horizontal axis.

A regulation of the water pressure is also possible in order to compensate for pressure variations in the mains system in order to accurately maintain the desired jet range and/or optionally to compensate for wind influences by changing the drop size.

BRIEF DESCRIPTION OF THE DRAWINGS

Further advantages and details of the invention will be explained in more detail using the following description of the figures.

DETAILED DESCRIPTION OF THE PREFERRED EMBODIMENT

Figure 1:
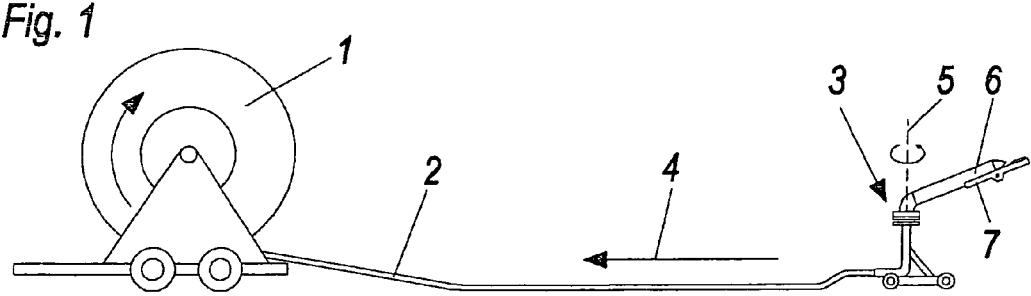
FIG. 1 shows an embodiment of a sprinkler system in a strongly schematic side view.
Figure 2:
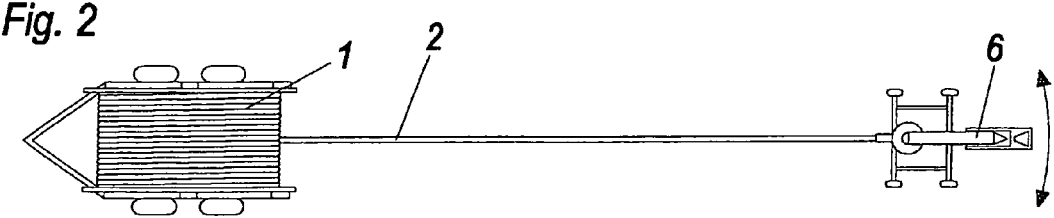
FIG. 2 shows a corresponding top view.

The sprinkler system for plant cultures represented in FIG. 1 has a water hose 2 which can be wound onto a spooler 1. There is arranged at the end of the water hose 2 a moveable sprinkler trolley 3 which can be retracted by winding the water hose 2 in the direction of the arrow 4. The sprinkler trolley 3 has a sprinkler arm 6 which is swivellable in a horizontal angle region about a vertical axis 5. The sprinkler arm 6 has a jet interrupter and diverter at the front, which on the one hand results in a fanned-out water jet and on the other hand can be used to move the sprinkler arm (to swivel over the sector to be sprinkled). FIG. 2 shows a top view of FIG. 1.

Figure 3:
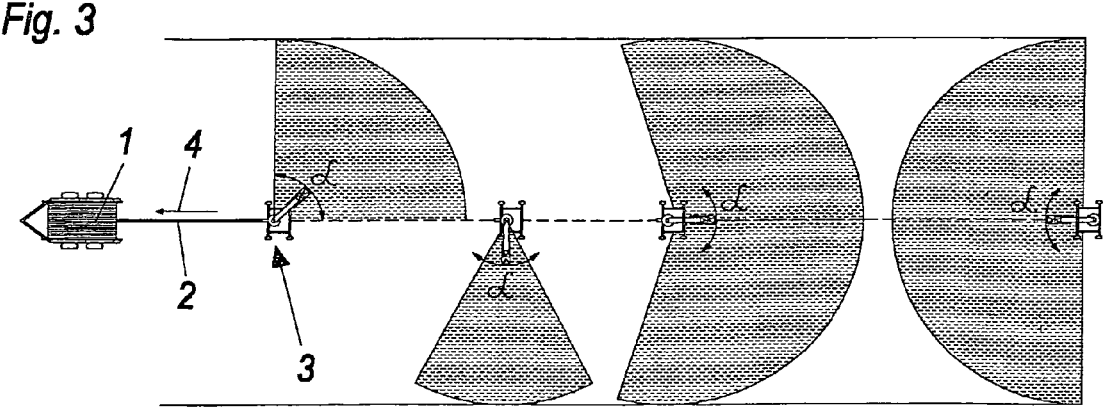
FIG. 3 shows in a schematic top view such a sprinkler system in operation, different horizontal angle regions (sectors) being irrigated depending on the retraction distance of the water hose to the spooler.

FIG. 3 likewise shows a top view, wherein four of the randomly different positions (retraction distances of the water hose 2) are represented by way of example. It can be seen that the sprinkler arm, in each of these different retraction positions of the water hose, sweeps different horizontal angle regions (sprinkling sectors) in width and alignment. The horizontal angle is designated a in each case. In the process, a road passing the end of the site for example can be omitted from irrigation. By means of a small horizontal angle region, for example a building which is present can be excluded from irrigation. Overall, the irrigation can thus be optimized and the water consumption reduced.

Figure 4:
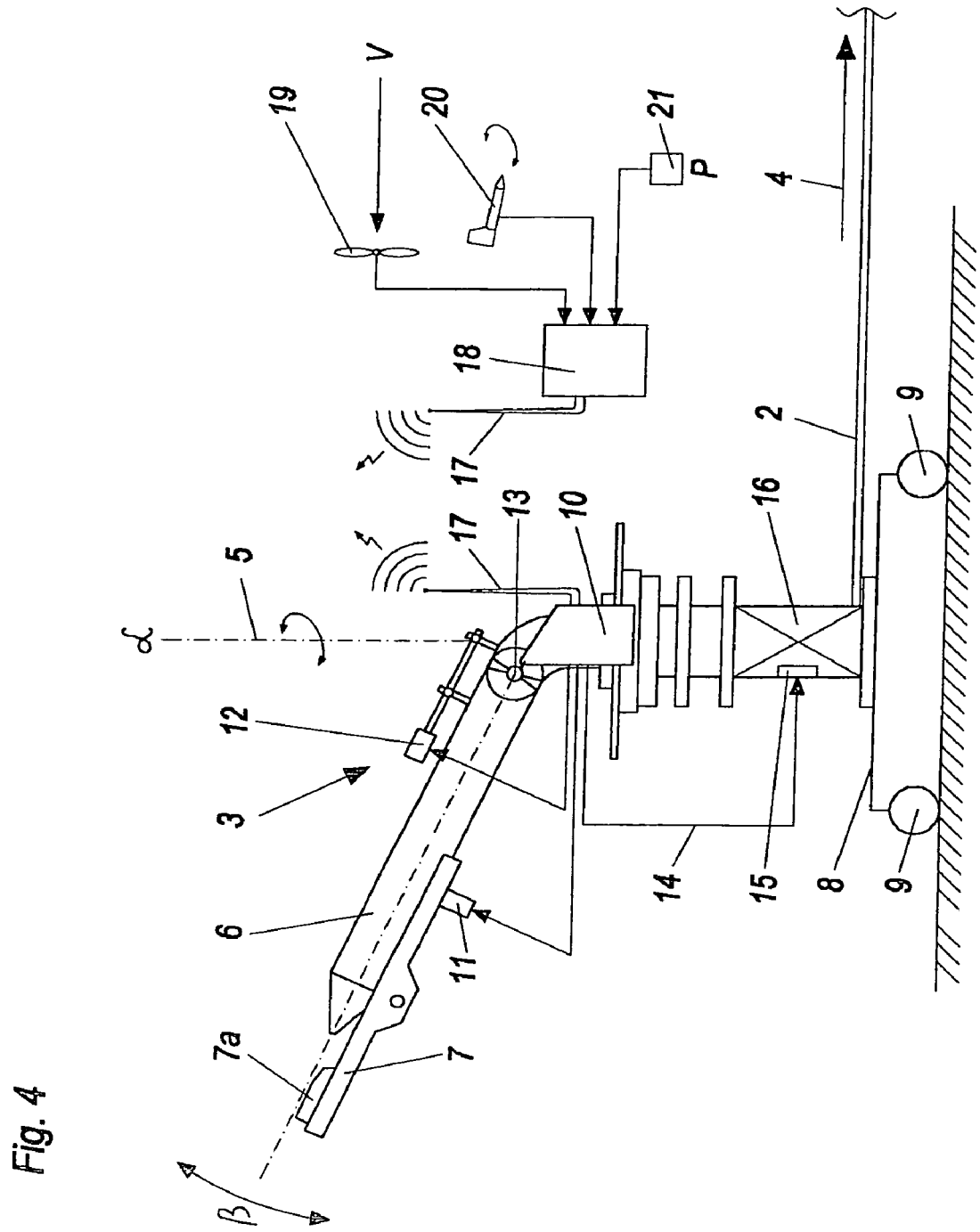
FIG. 4 shows an embodiment of a part of a sprinkler trolley developed according to the invention.

FIG. 4 then shows an embodiment of a sprinkler trolley according to the invention in greater detail. The sprinkler trolley represented is moveable, by pulling the water hose 2 in direction 4, on a stand 8 on wheels 9, represented schematically. The spooler which winds the hose 2 and thus draws the whole sprinkler trolley 3 is not represented in FIG. 4. The sprinkler trolley 3 has a sprinkler arm 6 which can be swivelled by an angle a about a vertical axis 5, in order to carry out a sprinkling over a horizontal angle region $\alpha$. This horizontal turning movement is driven by diverting the water jet in the combined jet interrupter and diverter 7. This is adjustable via the electronic control apparatus 10 via a control element 11, with the result that the turning direction is reversible. The control element 11 moves the jet interrupter and diverter 7 such that the diversion element 7a dipping into the jet runs displaced slightly left or right of the middle of the jet as desired. Thus a torque is exerted on the sprinkler arm 3 and this swivels in the desired direction. The water force is therefore used to sweep the horizontal angle region. Naturally there is alternatively also the possibility of actively using an electric servo motor or stepped motor in order to achieve the swivel about the vertical axis (angle $\alpha$). The horizontal movement exploiting the water jet is however already state of the art, with the result that with such a use, no conversion is required. This variant, which is shown in FIG. 4, can also be realized with robust components.

The electronic control apparatus described in more detail hereafter can also adjust the height position, i.e. the angle, about a horizontal axis 13 (angle $\beta$) of the sprinkler arm 6, using a servomotor 12. Finally the electronic control apparatus can control a pressure regulation valve 15 (represented schematically in support 16) via a control line 14, in order to influence the jet range with otherwise identical parameters.

With the embodiment represented in FIG. 4, the electronic control apparatus 10 is in radio contact with a remote station 18 which is optionally set up spatially separated, via antennae 17. This, together with the wind wheel 19 and the wind-direction measuring device 20, represents a device for recording the wind direction and/or the wind strength. In addition, this remote station, in combination with the pressure sensor 21, represents a device for recording the water pressure.

Figure 8:
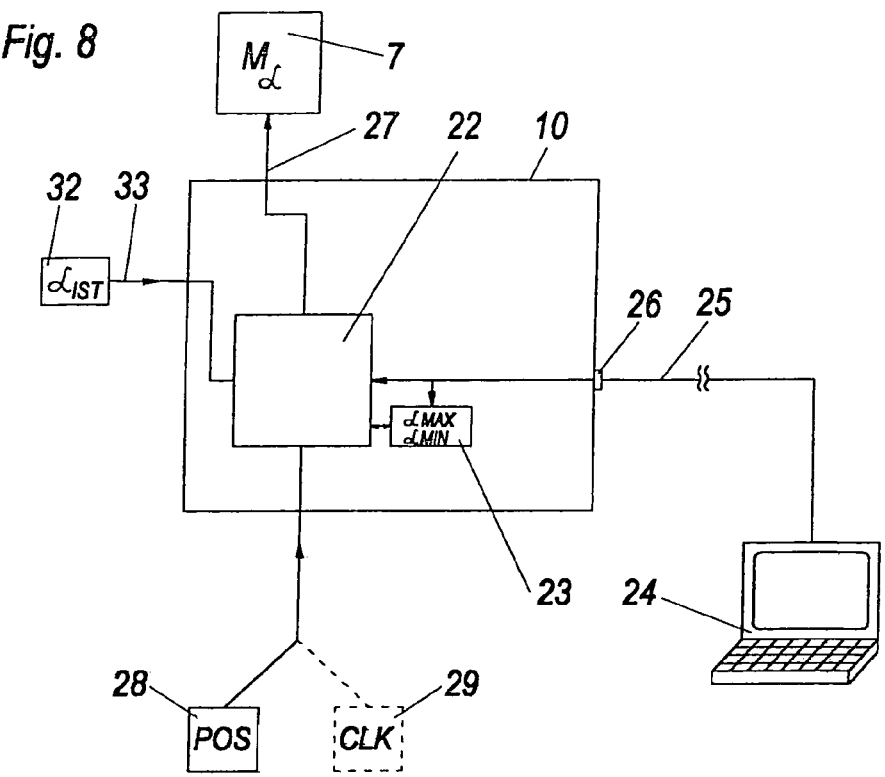

FIG. 8 now shows in a schematic block diagram a first embodiment of an electronic control apparatus of a sprinkler system according to the invention. The control apparatus 10 has a programmable sequencer 22 via which a sequence of stored horizontal angle regions can be specified. These horizontal angle regions are defined for example by their end points $\alpha_{MAX}$ and $\alpha_{MIN}$ and stored in the electronic memory 23. The electronic sequencer is programmable for example via an external programming device 24 (for example a personal computer) or a line 25 and an interface 26, wherein the horizontal angle regions can also be stored in the memory 23 via this device 24.

The sequencer 22 of the electronic control apparatus 10 preferably controls the horizontal angle by controlling the jet diverter 7 via the line 27 and the control element 11, and favourably depending on the position of the sprinkler trolley 3, recorded via the device 28, relative to the spooler 1, i.e. depending on the retraction distance of the hose 2. The whole device is very flexible. Numerous horizontal angle regions can be stored in the control apparatus and then selected by the sequencer 2 in the desired manner and sequence.

Figure 9:
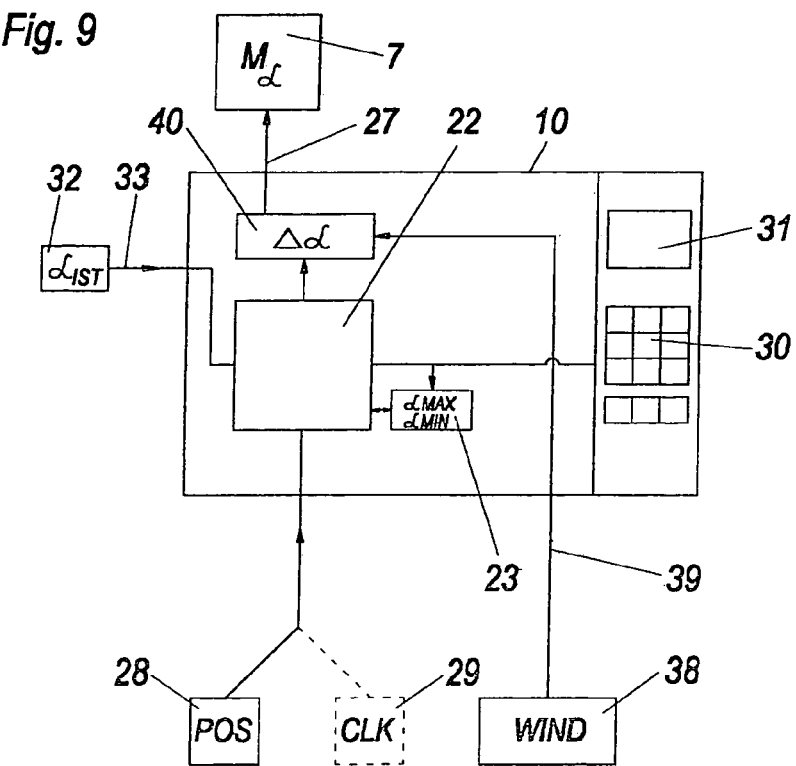
FIGS. 9 and 10 show further embodiments of such an electronic control apparatus.

As an alternative to dependency on the retraction distance, the sequencing can naturally also take place in purely time-dependent manner, i.e. depending on a time signal from a (in practice, preferably integrated) clock 29. The programming, including the storage of the turning points $\alpha_{MAX}$ and $\alpha_{MIN}$ defining the horizontal angle regions in the memory 3 can naturally also be carried out in a manner other than via a data line 15 and an external programming device 24, for example by means of an integrated keyboard 30 with display 31, as shown in FIG. 9. It is however also possible for example to provide a transportable chipcard which is programmed and loaded externally and then inserted into the sprinkler trolley or its electronic control apparatus.

In FIG. 8, another device 32 is provided for recording the actual value of the current horizontal angle ($\alpha_{IST}$) of the sprinkler arm 6, this device 32 delivering an electric signal via a line 33 to the electronic control apparatus 10, more precisely to the sequencer 22. This then displaces the horizontal angle, via the control element 11 using the jet diverter 7, until the actual current turning point $\alpha_{MAX}$ or $\alpha_{MIN}$ is reached. It can thereby be ensured that the sprinkler arm 6 turns back and forth precisely between the two currently active horizontal angle turning points $\alpha_{MAX}$ and $\alpha_{MIN}$. The named angles are measured relative to the sprinkler trolley 3.

It goes without saying that the memory 23 and the electronic sequencer 22 can be combined in one common microprocessor unit.

Figure 5:
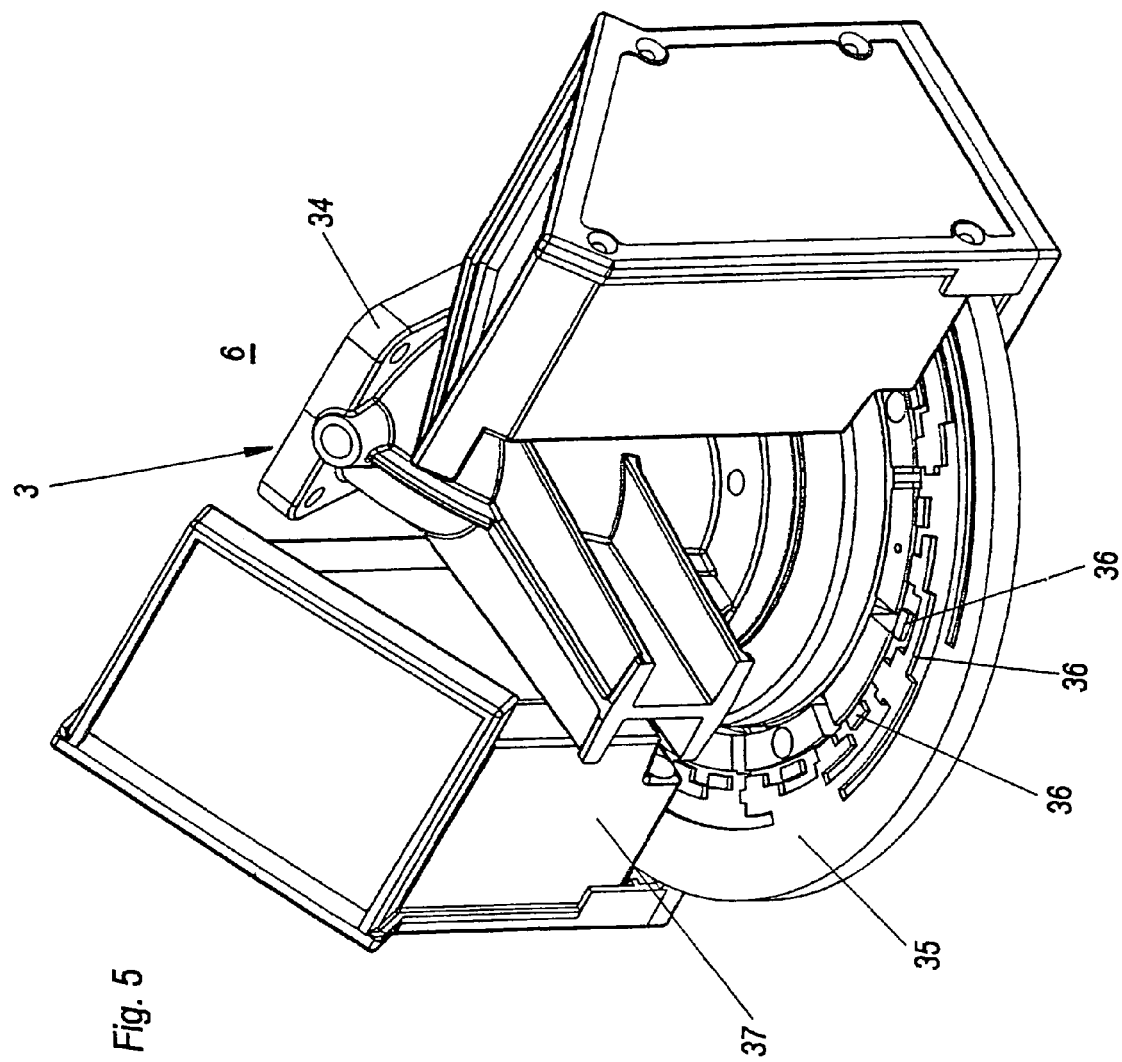
FIG. 5 shows a detail of such a sprinkler trolley, namely in the region of the axle bearing of the sprinkler arm not represented in more detail.

FIG. 5 shows the bearing region of the sprinkler arm 6 which, for the sake of clarity is not represented itself. It is secured to the flange 34. There is connected in rotation-resistant manner to the undercarriage of the sprinkler trolley a disk 35 which has recesses 36 coded in Gray code, which can be read in the control box 37 by a series of radially arranged Hall sensors. The control box 37 or the Hall sensors, not represented in more detail, are connected in rotation-resistant manner to the flange 34 for the sprinkler arm. Thus via this device, the actual value of the horizontal angle of the sprinkler arm can be recorded and passed onto the electronic control apparatus 10. This version is particularly robust and suitable for the rough conditions when operating such a sprinkler. Naturally however, other devices for recording the actual value of the current horizontal angle are also possible, for example angle encoders driven via toothed belts or similar.

Figure 6:
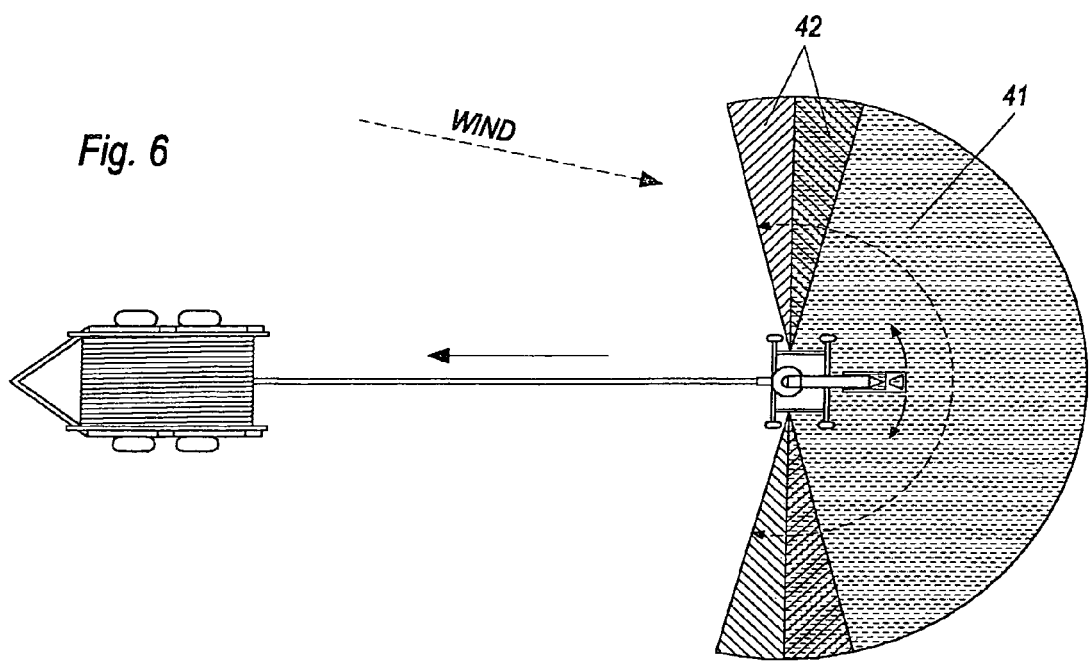
FIG. 6 shows the automatic compensation of the irrigation sector in the case of wind influence.

The embodiment of an electronic control apparatus 10 represented in FIG. 9 corresponds in numerous components to the embodiment of FIG. 8, which have the same reference numbers and are therefore not described again. The difference, as already mentioned, is the integrated operating unit with a keyboard 30 and a display 31 for programming the sequencer 22 or storing the desired turning points for the horizontal angle region in the memory 23. Moreover, the apparatus according to FIG. 9 has a device 38 for recording the wind strength or wind direction. This device delivers electric control signals via the line 39 to a correction unit 40 which can naturally also be integrated in the electronic sequencer. Thus the original (without wind) horizontal angle region (dotted sector in FIG. 6 with reference number 41) to be sprinkled can be displaced, according to wind direction and strength, as is represented in FIG. 6 with reference number 42. Together with the wind influence, the result is then essentially in turn the irrigation of the desired dotted surface 41.

Figure 7:
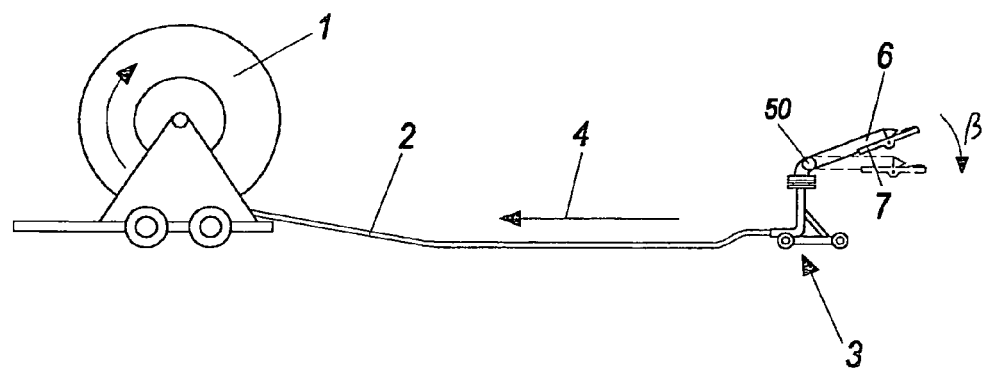
FIG. 7 shows an embodiment of a variant which is variable in the vertical angle or the height setting of the sprinkler arm, FIG. 8 Shows the electronic control apparatus of an embodiment of a sprinkler system according to the invention in a block diagram.
Figure 10:
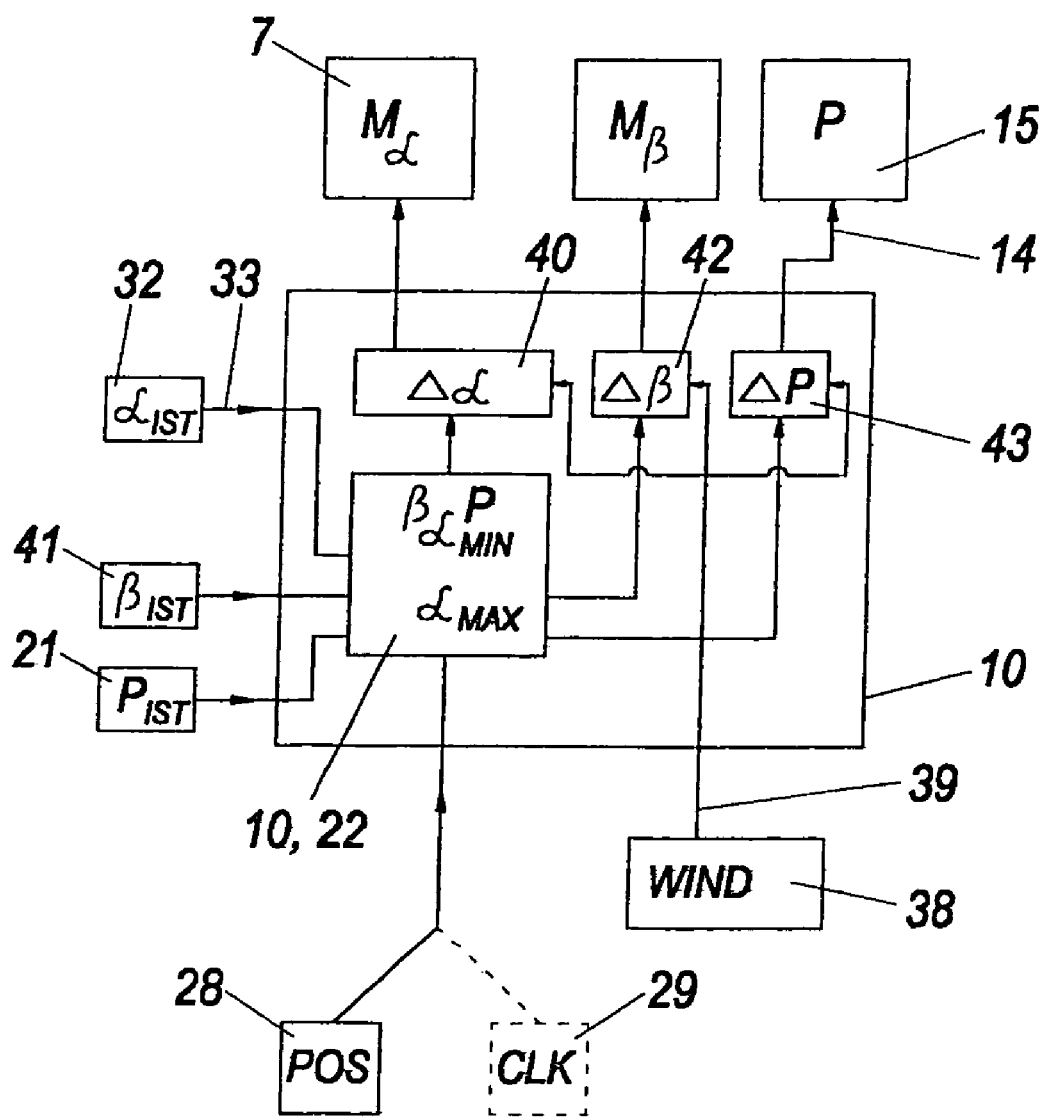

In the case of the embodiment represented in FIG. 10, for the sake of clarity the programming and/or operating device is not represented. It can be developed for example as mentioned above. In addition, in this embodiment, the memory for the turning points of the horizontal angle regions is integrated in the sequencer 22. Otherwise this embodiment has in turn some components which correspond to the previous examples, and therefore need not be explained again here. With this embodiment, in addition to a change of the horizontal angle region ($\alpha$), the height angle $\alpha$ can also be varied, depending on the wind influence. In order to be able to carry this out in the sense of a precise regulation, a device 41 for recording the actual value of the current height angle $\beta_{IST}$ is provided. Depending on the wind influence, the height angle can then be varied via a correction device 42 which can naturally also be integrated in the electronic sequencer 22. For example, it is possible to reduce the height angle somewhat, as is represented in FIG. 7 (exaggerated for better representation). A flatter jet curve and a lower capacity to be influenced by—in particular lateral—wind influences can thereby be achieved.

In addition it is possible to regulate the water pressure, to which end a device 21 for recording the actual value of the water pressure is provided. The water pressure can be regulated to adjust the jet range and to compensate for pressure deviations, the electronic control apparatus 10 delivering a signal via the line 14 to a pressure regulation valve 15 (cf. also FIG. 4). In addition, provision can also be made to correct the water pressure depending on the wind influence, for example in the unit 43 which can also be integrated in the electronic sequencer 22.

Figure 11:
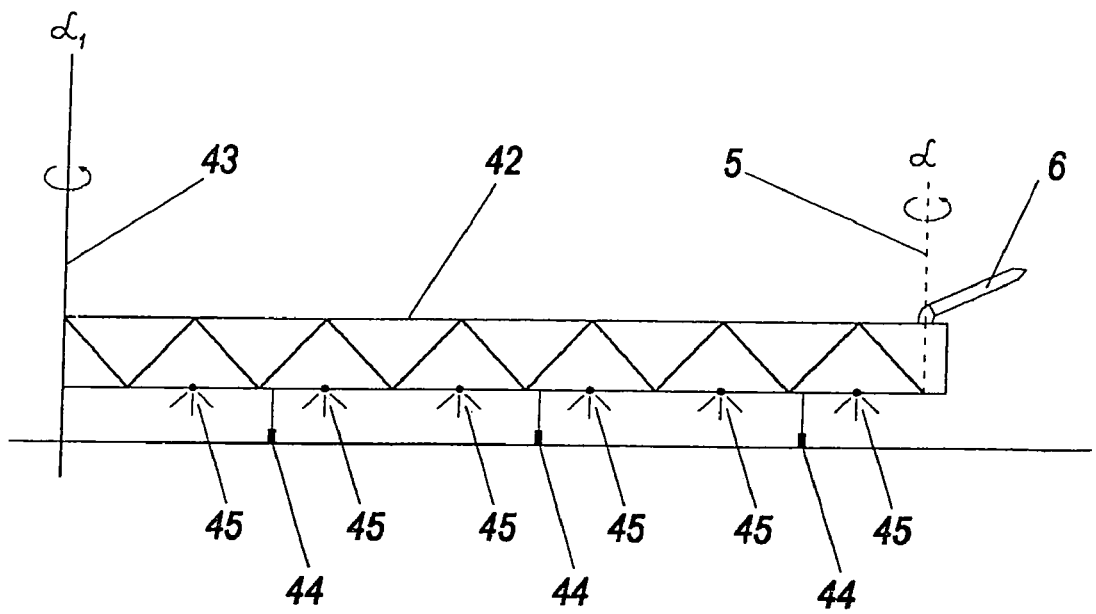
FIG. 11 shows an example with a large rotatable irrigation arm in side view.

FIG. 11 shows an embodiment in which the sprinkler arm 6 is housed at the free end of a large rotatably housed irrigation arm 42. This large irrigation arm is moveable about an axis 43 (horizontal angle $\alpha_1$) by a drive not represented in more detail. Such irrigation systems are used to irrigate large plant cultures. They move on wheels 44 and distribute water via nozzles 45.

The sprinkler arm 6 is housed swivellably about a vertical axis 5 (angle $\alpha$) relative to the large irrigation arm 42.

Figure 12:
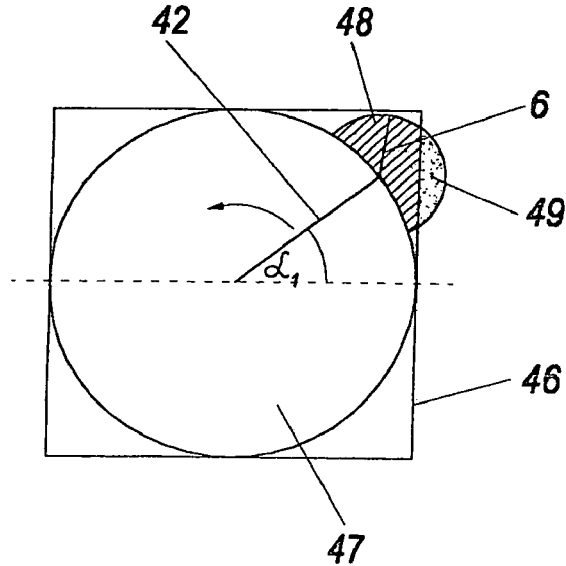
FIG. 12 shows a schematic top view of an example according to FIG. 11.

This results in the situation represented in FIG. 12, for example to irrigate a square site 46. The large irrigation arm 42 can irrigate essentially the circular area 47 by rotation about the angle $\alpha_1$. The surfaces between the corners of the square and the circle would normally remain unirrigated. The rotatable sprinkler arm 6 secured at the end of the large irrigation arm 42 serves to do this, which can also irrigate the surface 48. It can even be achieved by reducing the water pressure and/or the pressure height that no surface 49 outside the square 46 is irrigated, if such an irrigation would cause problems. In general, however, the issue here is not completely accurate limits, but rather to optimally sprinkle the surface areas between the circle and the square in the corners by the sprinkler arm 6 whilst saving as much water as possible.

Figure 13:
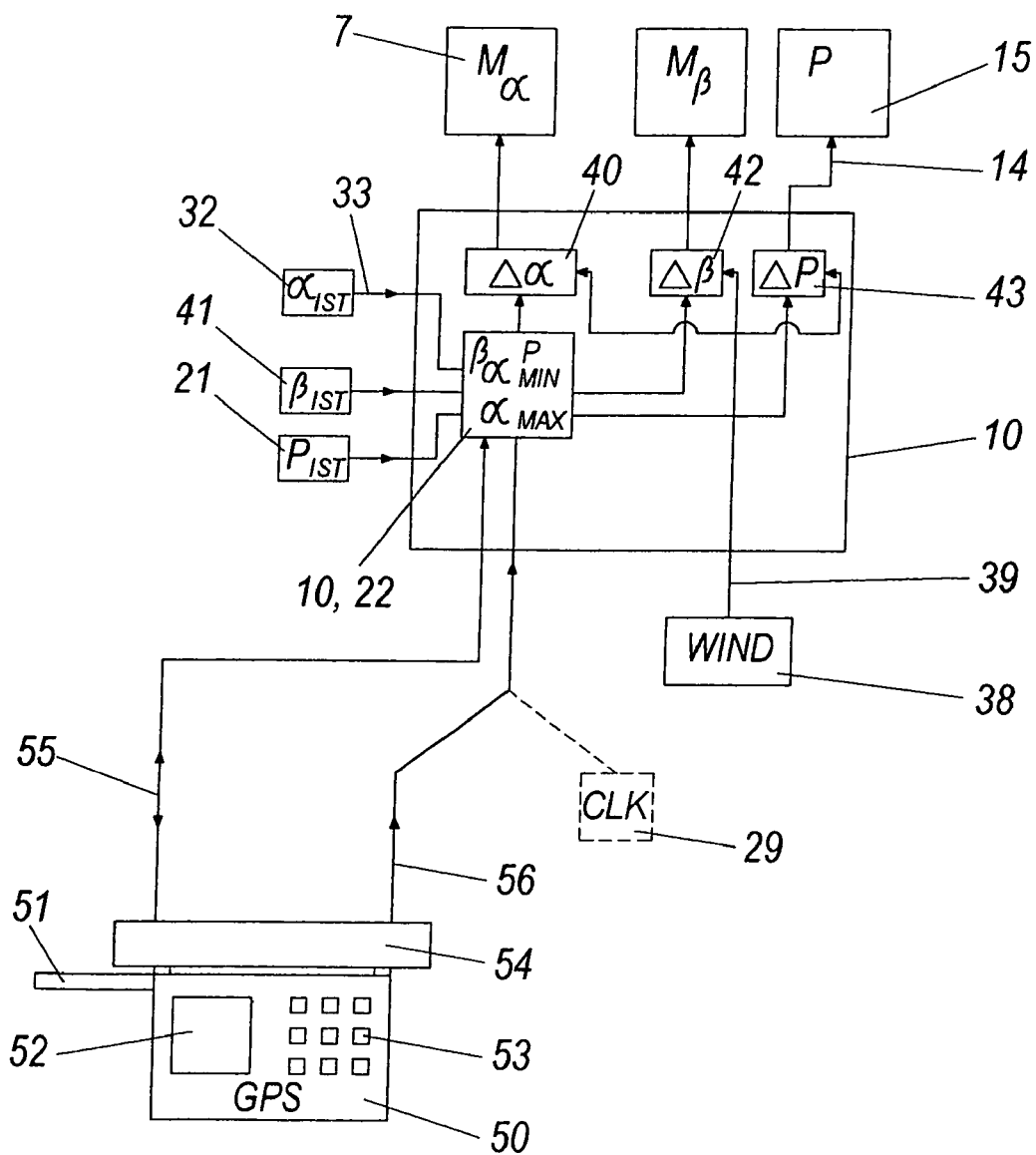
FIG. 13 shows an embodiment of an electronic control apparatus which is supplemented by a GPS receiver with a memory for storing several ground points.

In the embodiment represented in FIG. 13, the control apparatus 10 is supplemented by a GPS receiver 50. This GPS receiver 50 has a memory for storing several ground points, which will be explained in more detail hereafter. Such a GPS receiver has an antenna 51, a display 52 and a keyboard 53. As a GPS system (global positioning system) it is capable of accurately establishing its position from satellite data.

In the embodiment represented, the GPS receiver 50 is detachably developed from a console 54 to which it is connected via plug contacts. This enables a mode of operation which will be described in more detail hereafter. It is essentially constituted in that a field to be sprinkled is surveyed to its limits with the detached GPS receiver and the corner points defining the field are entered. These are then stored in the memory of the GPS receiver itself. The ground data can either be loaded via the line 55 into a memory of the control apparatus 10 or remain in the memory of the GPS receiver 50, the sequencer 22 then accessing these data. During the actual sprinkling process, the GPS receiver regularly passes position data on to the control apparatus 10 via the line 56. A separate device 28, as was described with the earlier embodiments, can therefore be dispensed with.

In detail, the system functions as follows:

A detachable GPS receiver module 50 which is connected to the system control 10 is mounted on the sprinkler. A memory for storing GPS points is integrated into this recipient module. A commercial GPS hand-held device with interface is preferably used. It is however possible to install a GPS module into its own housing.

Figure 14:
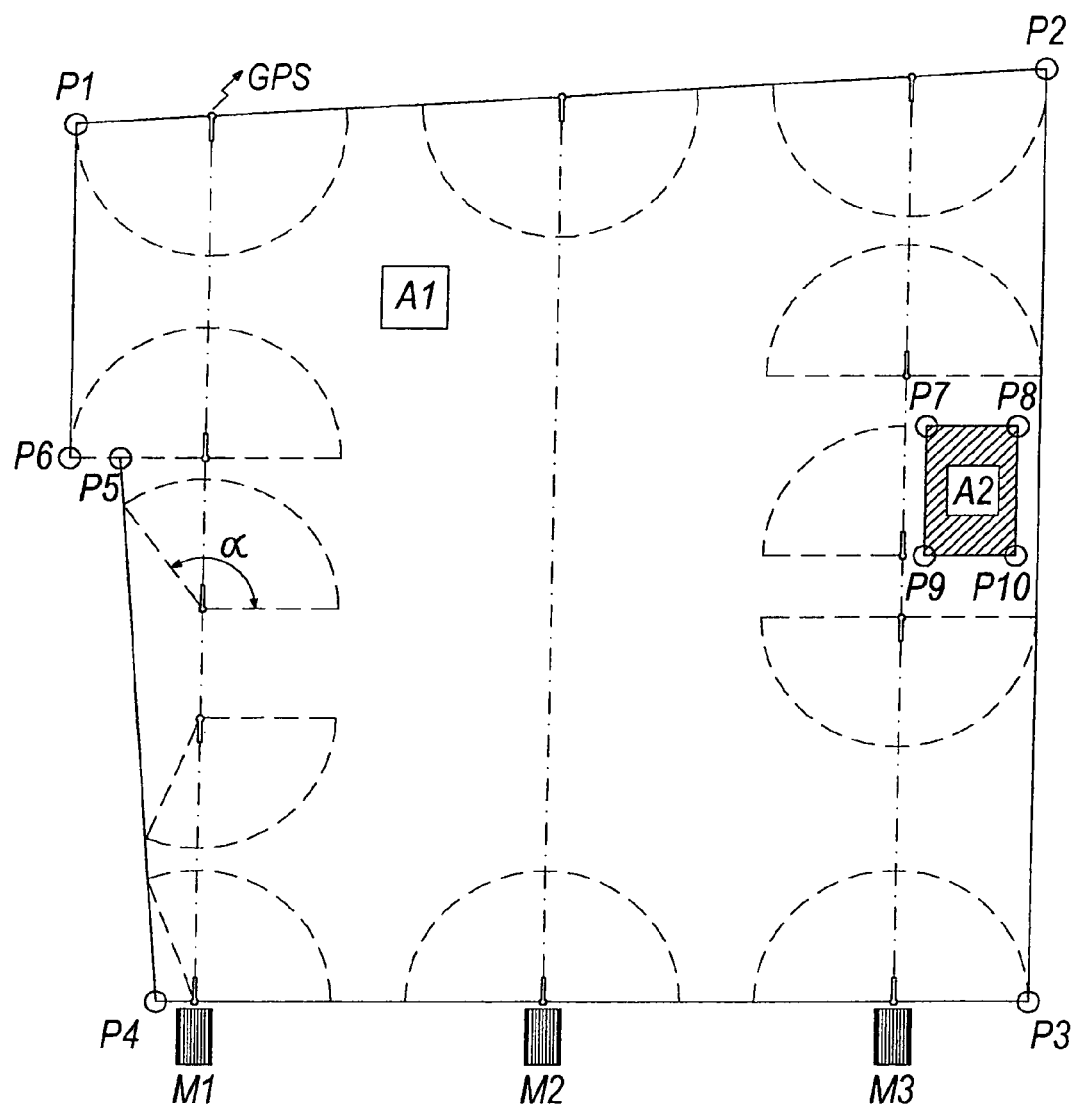
FIG. 14 shows an example of a field to be sprinkled with a surface A1 to be sprinkled and a surface A2 to be omitted, which are defined by ground points recorded by means of a GPS system.

Upon first use of the device on a specific field or when using it on a new field, the user detaches the GPS module from the sprinkler and surveys the limits of the field. The GPS data from each corner point of the field are stored. To describe a field A1, any number of corner points can be stored, at least however three points. In FIG. 14, these are P1–P6. If there are surfaces or buildings or obstacles inside the field which are not to be sprinkled, the corner points of the surface A2 to be excluded, P7–P10 in FIG. 14, are likewise correspondingly stored.

The user secures the module 50 back in its place on the sprinkler control system. The sprinkler system is put into operation. The system knows through the GPS where the sprinkler is located. An algorithm which is integrated in the system control of the sprinkler calculates, using the current GPS position of the sprinkler and the connection lines of the previously stored corner points, the current sector angle (horizontal angle $\alpha$) required to keep within and optimally sprinkle the surface. The sector angle is transmitted to the control system of the sprinkler machinery, which for its part calculates and sets the retraction speed of the sprinkler, corresponding to the respective sector angle, to achieve a constant precipitation quantity over the whole retraction distance of the sprinkler.

If the sprinkler encounters a surface which is to be excluded from sprinkling, the sector angle is adjusted such that the surface is circumscribed.

In the calculation of the retraction speed it is also taken into account whether the sprinkler will twice sprinkle a surface swept by the water jet. This is the case if the sprinkler changes its main orientation direction by 180°, as at the beginning or at the end or at stages of the field.

The jet range can also be adjusted depending on the GPS points, if this is necessary.

In FIG. 14, some sector angles required for the complete sprinkling of the surface A1 and circumscription of the surface A2 are represented schematically.

The set-up positions of the sprinkler machine are selected to explain the function principle. In practice, the intervals between two positions of the sprinkler machine are selected such that there is an overlap of the surface to be sprinkled.

With center pivot systems (as shown for example in FIG. 12), the corner points of the surface to be sprinkled can also be stored, and the sprinkler will then only sprinkle in this area. In order to keep the water distribution constant here also, it is useful to control the operating time of the sprinkler at the beginning and at the end of a sector to be sprinkled.

The advantage of this GPS-controlled system is that the sprinkler of the sprinkler machine does not require any position data about its current position in the field and can thus calculate the horizontal sector angle required to keep within the field limits autonomously and independently. No data transfer is required, this means that the thus-equipped sprinkler can be backfitted to any sprinkler machine, even very old machines.

A further great advantage is that this system makes it possible to fully sprinkle a field into the corners without the field limits being exceeded, or be able to accurately bypass surfaces located in the field which are not to be sprinkled.

An additional improvement to the above independent system can be achieved if the sprinkler transmits its current horizontal sector angle to the control system of the sprinkler machine (radio or cable). The sprinkler machine can then regulate for its part the retraction speed of the sprinkler such that the water quantity released by the sprinkler per time unit remains constant on the surface delimited by the respective horizontal sector angle. Thus a uniform water distribution is guaranteed over the whole sprinkled surface.

Data from any number of fields can be stored, the sprinkler recognizes automatically in which field and at which set-up position of the sprinkler machine in the field it is located and regulates the horizontal sector angle correspondingly.

The GPS module can be detached from the sprinkler and used to record the corner points of the field, as was already described.

As the above examples show, the sprinkler system according to the invention can be realized in numerous ways. Naturally, further variants are also conceivable and possible. For example, instead of plant cultures, coal piles or ore piles can also be sprinkled. The invention can also be used in waste water irrigation. In particular rotatable but otherwise not displaceably or moveably housed fixed sprinklers can be used.

The invention claimed is:

1. A Sprinkler system with a sprinkler arm swivellable in a horizontal angle region about an essentially vertical axis, from which a water jet emerges at the front, with an electronic control apparatus via which the horizontal angle region swept by the sprinkler arm can be adjusted, wherein said sprinkler arm is housed freely rotatable and has a turnably housed, controllable water-jet diverter via which a torque can be exerted on the sprinkler arm, said water-jet diverter being controlled by the electronic control apparatus via a control element.

2. The sprinkler system of claim 1, wherein said control apparatus has an electronic memory in which values for at least two horizontal angle regions can be digitally stored and a programmable sequencer via which a sequence of stored horizontal angle regions can be specified.

3. The sprinkler system of claim 1, wherein said sprinkler arm is swivellable about its essentially vertical axis by an electric servomotor, said servomotor being controlled by said electronic control apparatus.

4. The sprinkler system of claim 1, wherein said sprinkler arm is swivellable about its essentially vertical axis by an electric stepping motor, said stepping motor being controlled by said electronic control apparatus.

5. The sprinkler system of claim 1, wherein a device for recording the actual value of the current horizontal angle of the sprinkler arm is provided, said device delivering an electric signal to the electronic control apparatus.

6. The sprinkler system of claim 5, wherein said device for recording the actual value of the current horizontal angle has a disk made of magnetizable material with recesses, several Hall sensors aligned in radial direction of the disk delivering signals to said electronic control apparatus corresponding to the horizontal angle of the sprinkler arm depending on their relative position to the disk.

7. The sprinkler system of claim 6, wherein the recesses in the disk are coded in Gray code.

8. The sprinkler system of claim 5, wherein said device for recording the actual value of the current horizontal angle has an angle encoder.

9. The sprinkler system of claim 8, wherein said angle encoder is driven by a toothed belt.

* * * * *